Figures 1, 2, 3:
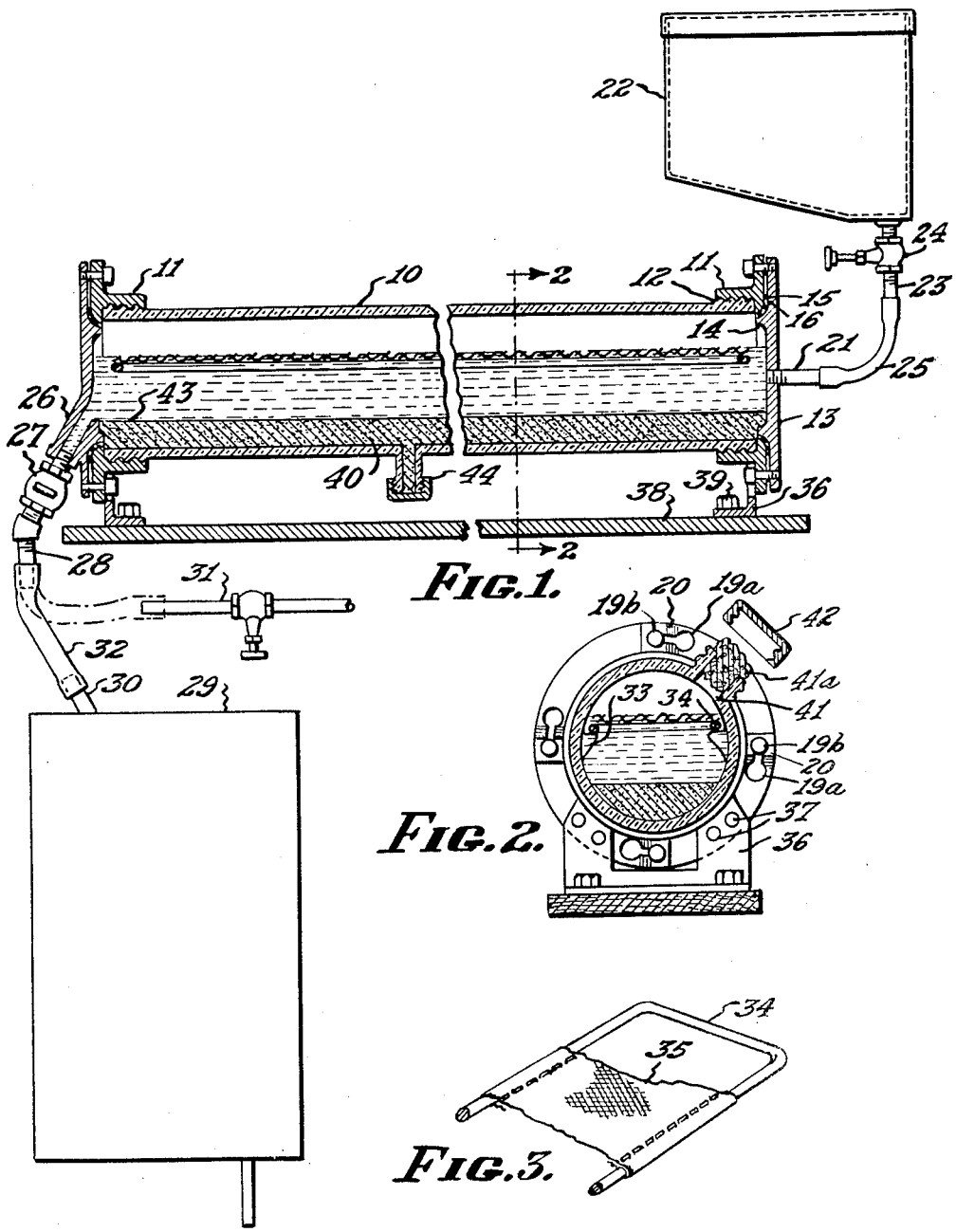

Aug. 22, 1950   G. HALLER   2,519,902
PROCESS FOR FORMING PENICILLIN SOLUTION
Filed Jan. 27, 1949

INVENTOR.
GRACE HALLER,
BY Allen & Allen
ATTORNEYS.

UNITED STATES PATENT OFFICE 2,519,902

PROCESS FOR FORMING PENICILLIN SOLUTION

Grace Haller, Moscow, Ohio

Application January 27, 1949, Serial No. 73,125

4 Claims. (Cl. 195—36)

This application is a continuation-in-part of my co-pending application Serial No. 579,486, filed February 23, 1945, and now abandoned and entitled Process for Forming Penicillin Solution.

In the forming of penicillin the mold known as *Penicillium notatum* is grown on the suitable nutrient solution and the chemical substance produced in the growth is collected in a solution in water. The object of the invention is to produce the solution from which the pharmaceutical substance known as penicillin can be isolated. My primary interest at this time does not concern the isolation practice, but merely the development of the solution.

One difficulty in connection with the production of such solutions is the time/factor involved. It is the object of my invention to reduce the time now consumed in industrial penicillin production, and produce a solution directly from the process. I have been able to cut in half the production time of any practice with which I am familiar. The normal culturing period is around five days.

It is a further object of my invention to provide suitable apparatus for carrying out my process.

Other features and advantages of my invention will become apparent during the course of the following description with reference to the accompanying drawings in which like figures are used to denote like parts throughout the same, and in which:

Figure 1 is a longitudinal section of the mold growing chamber, other elements of the apparatus being there shown more or less diagrammatically, Figure 2 is a cross section taken on the line 2—2 of Figure 1, and Figure 3 is a prespective view of an element adapted for use in the mold growing chamber.

In order that my invention may be most clearly presented I will first describe my new process, after which I will describe with particularity apparatus which I have found satisfactory in conducting my process and which is set forth in the above noted drawings.

The invention involves a certain technique as to which I do not wish to take a position that any one factor is the controlling one, athough, according to the theory which dictated the practice certain of the steps appear to be the reason for the success of my operation.

I find it best to conduct the operation in flasks, or tanks, which will preferably have a valved outlet in the side, to permit a ready decanting of the finished solution from between the mash used and the supernatant mold.

I start with a pure strain of the mold or fungus known as *Penicillium notatum*. This is ordinarily developed in agar tubes and the technique of producing such pure strains has been fully developed. The nutrient solution which I employ contains lactose 40 grams, and traces of several inorganic sulphates, running to around a total of one per cent solids. I prefer to use .25 gr. hydrated magnesium sulphate ($MgSO_4-7H_2O$), .5 gr. potassium dihydrogenphosphate ($KH_2PO_4$) and .05 gr. hydrated zinc sulphate $$(ZnSO_4-7H_2O).$$

The sulphates in this quantity will assist in mold growth and others may be selected from those employed in chemical plant growing practices. I also employ around 3 gr. sodium nitrate ($NaNO_3$), which is a representative chemical plant growth accelerator. So far the chemical content of the nutrient solution follows accepted practice.

As a source of protein and other soluble organic substances, I add 50 gr. of at least one of that class of cereal products consisting of hominy meal, whole ground rye, wheat bran and untreated whole corn meal. Prior to this invention it has been the practice to use a substance known as corn steep for supplying food for the mold; but the formation of corn steep, in the processing of corn for production of starch and sugars, involves the use of sulphurous acid. Hominy meal on the other hand is made by merely steam treating the corn and removing the hulls and germs from the kernels, leaving the starch portions which go into the production of hominy for human consumption, whereas the removed portion consisting of the hulls and germs is ground up to form the hominy meal. The hominy meal seems to provide a better source of growth producing materials than the corn steep and, in fact, with my practice corn steep is not desirable. I have also found that whole ground rye is quite satisfactory for use in my process as well as wheat bran. Untreated whole corn meal—as distinguished from corn steep—also produces satisfactory results, although it appears best to mix it with hominy meal. I have tried other cereals, such as barley and oats, but without success. I do not know the reason for this division between the various cereals, but it does exist and therefore I shall limit my claims to those cereal products which have produced satisfactory results as above set forth.

The nutrient solution is built up to one liter (roughly 1000 grams) by the addition of water. I use tap water and in my practice this water is obtained from the mains of the Cincinnati, Ohio, waterworks.

The chemical nature of this tap water is apparently not important since with distilled water of minimum mineral content the process is, if anything, a little faster. It is of interest, however, that the water I use is filtered river water in which ferric chloride and alum have been used in the filtering operation and purification steps followed in preparation for the water mains so as to render the water potable.

The nutrient solution with the hominy meal—or other of the above enumerated satisfactory products or combinations thereof—in it is placed in flasks of convenient size and rendered sterile in an autoclave, operated at around a pressure of 15 pounds for 20 minutes. It is then cooled, or permitted to cool to room temperature.

The mold is then inoculated into the nutrient solution which is placed in a controlled incubator held at 20 to 25° C., which is the standard temperature used in growing this mold. I inoculate the mold by the use of a sterile glass rod with wire loop to pick up the mold spores and simply wash it off in the solution. By this time the cereal product which is suspended in the solution when placing the solution in the flask will have settled to the bottom of the flask. The mold should not be subjected to strong light.

The mold then grows on the surface of the nutrient solution (which is kept at growing temperature), floating there and soon begins to color the solution a yellowish color, which is due to the development of chrysogenin, one of the products of mold growth. The solution is tested for pH by practice which keeps sterile conditions, and when it has reached a pH of 7, the solution is tested by titration against a standard culture of *Staphylococcus aureus*, which is standard procedure. It will be found that when the pH has reached 7, or slightly above, this test will be satisfied unless something has gone wrong with the culture or sterile conditions. The time consumed in reaching this condition will not greatly exceed 48 hours. Furthermore, the pH tends to remain constant between 7 and 8.

Having satisfied the titration test, the nutrient solution is then largely decanted from the flask either by careful pouring so as to leave both the precipitated cereal product and the mold in the flask, or preferably by a side spout in the flask itself which will be located just above the interface of the cereal product and the rest of the nutrient solution. It should also be noted that something other than a flask could be used, although the solution should not be too deep. In my flasks, which are small in cross-section, the nutrient solution is around 2-inches deep. The liquid thus obtained is the penicillin solution ready for extraction steps for isolating the drug penicillin, with which I am not primarily concerned. It should be noted that no steps are necessary to form a solution or filter it, a procedure where sterile conditions must be maintained following the mold growth and development of the penicillin. The growth is on the surface of the nutrient solution, the penicillin is dissolved in the solution.

The liquid will preserve its constituents if kept at around 5° C. for an indefinite period, and can be used directly on the surface of the body without extraction procedures. There may be conditions when the mold may be left for much extended periods over the 48 hours and further penicillin be produced, but longer growth will tend to produce more of the yellow dye. For longer periods of growth it is desirable to agitate by gently shaking the container to stir up the mash slightly being careful not to break up the mold.

It will be noted that I leave some of the nutrient solution and mold in the flask. When decanting the solution no spores are present. I then keep the flask at around 20 to 25° C. and let it stand for several weeks. The time limit will ordinarily be around 18 days. It will be noted that the mold, as its growth continues, begins to develop its spores, which show as a greenish scum on the surface of the mold.

I then use the spores as the culture for starting new growths in new flasks of the nutrient solution. This is done by the use of the glass rod with the wire loop, whereby I skim up the green scum and wash it off in the newly prepared and autoclaved solution in another flask. According to my observation, the use of the spores at a certain age for starting a new growth assists among other things in the rapidity with which the mold grows and develops the chemical substances which it is desired to obtain.

As already noted, the importance of the various details of my practice with relation to the extremely short time required to develop the penicillin solution is not known to me, and hence, while I give specific directions in the above, it may well be that certain of the items are more important than others. Suffice it to say that I am able to produce penicillin solution by following the specific practice in half the time or less and with less manipulations than in any other process that has come to my attention.

The practice is of greater advantage than using culture from the agar tubes each time. The growth from spores as above described makes for splendid growth and rich development of the desired substances, as well as maintaining a fast growing strain of the fungus. The growth of the mold on a solution above the body of cereal product results in entirely avoiding the step of removing and filtering the solution from a moistened nutrient mass, as is largely the commercial practice. What is required is the development in the solution of such soluble growth maintaining elements as come from a meal of hulls and germs of starchy grains which have not been acid treated and thus reduced in availability to the mold due to chemical change, or at least which do not go into the solution with precipitation of proteins to some extent, as does corn steep. Thus, those cereal products which I have found to be best suited for use in my process are hominy, meal, wheat bran, whole ground rye and untreated whole corn meal.

Referring now to the drawings, especially Figure 1, I have shown a tank 10 in which the penicillin solution is developed. I have illustrated this tank as being in the form of a cylinder, but it is within the scope of my invention to make the tank in some other form—such as a flat tray-shaped receptacle or the like. I prefer a cylinder about one foot in diameter and this is what I have illustrated in Figure 1. The tank 10 could be constructed of some non-corrosive metal, although I have shown it according to my preferred version as being made of glass.

Both ends of the tank 10 are provided with flanged end pieces 11 which are secured to the tank by means of threads indicated at 12. These threads, in the case of a glass chamber, may be cast into the cylinder when it is formed. Each end of the chamber 10 is provided with a cap 13 for closing it. Each cap 13 is provided with a rim 14 which projects into the tank 10. This rim underlies the face portion 15 of the member 11. A gasket 16 is placed between the member 15 and the surface formed by the inner face of the cap 13 and outer face of the rim 14. The caps 13 are removably fastened to the end pieces 11 by means of bayonet pin and slot arrangements as best seen in Figure 2. Bayonet pins 17 having heads 18 are provided for the caps 13. The end pieces 11 are provided with slots 19 comprising two circular openings joined by a narrow opening extending therebetween. One of the circular openings (19a) is large enough to permit passage of the head 18 through it, and the other circular opening (19b) is small enough to prevent passage of the head 18 through it. It is preferable to construct the piece 11 in such a way that there is a slope 20 in the piece, see Figure 2, extending from its low portion at 19a to a higher portion at 19b. Thus the caps 13 are placed against the piece 11 so that the pins 17 pass through the openings 19a. Then the caps 13 are turned. Such turn serves to lock the caps 13 to the end pieces 11 by the action of the pin 17 with its head 18 in passing from the opening 19a up the slope 20 to the small opening 19b. In this latter position a good sealing has been attained by reason of the fact that the head 18 cannot pull out of the opening 19b, and because the cap 13 and end piece 11 have been drawn together by the action obtained due to the slope 20.

One of the caps 13 is provided with an inlet tube 21, or the like, through which nutrient solution may enter the chamber 10. The inlet port 21 should be located intermediate the layer of cereal product with which the tank will be charged and the surface of the liquid solution with which said tank will be partially filled, as will be described more fully later. Such nutrient solution may be obtained from a supply source indicated generally at 22. This supply source and leads therefrom should always be kept sterile. An outlet 23 regulated by a valve 24 is provided for the tank or the like 22. A flexible connection 25, adapted to be slipped over the inlet 21 and outlet 23 is also provided. The inlet port 21 may also be adapted to receive a cap or plug of some standard type not shown, for a purpose to be described later.

The other of the caps 13 is provided with an exhaust port 26 adapted to receive a valve 27 having an outlet tube or the like 28. The exhaust port 26 should be located just above the layer of cereal product with which the tank will be charged, as will be described later. At 29 I have indicated a freezing element having an outlet 30. At 31 I have shown the outlet from a source of steam not shown. A flexible connection 32 adapted to fit the ports 28, 30 and 31, as desired, is also provided.

Lugs 33 are provided inside the tank 10 as indicated at Figure 2. These lugs form a support or rest for a frame 34, see Figure 3, which is constructed of some non-corrosive material and upon which is stretched some porous material such as cheese cloth, or the like, as indicated at 35.

The flanged end pieces 11 are further adapted to be secured to a bracket 36 as by means of bolts or the like 37. The bracket 36 is in turn adapted to be secured to a suitable base 38 by means of bolts or the like 39.

This apparatus may be used as follows: By removing either one or both of the caps 13, preferably the one containing the exhaust port 26, the tank 10 may be made accessible for loading purposes. The tank is then charged, as indicated at 40, with the proper amount of the cereal product used, i. e., either hominy meal, whole ground rye, wheat bran, untreated whole corn meal, or some combination thereof. The cheese cloth covered frame 34 may then be placed in the tank 10 upon the lugs 33. Then, with the flexible connection 25 disconnected from the inlet port 21, and the flexible connection 32 connected between the source of steam 31 and valve extension 28, both caps 13 having been secured to the tank) the tank 10, meal 40 and frame-cloth support 34—35 may be sterilized by running steam through the apparatus. Sterilization may also be obtained by plugging the port 21 with a suitable stopper and building up adequate steam pressure within the tank 10.

After the tank 10 and everything in it has been properly sterilized, the valve 27 is closed and the flexible connection 25 positioned between the ports 21 and 23. Sterilized nutrient solution from the supply source 22 is then admitted into the tank 10 in such quantities that the level of the solution within the tank is brought to, or just above, the level of the cheese cloth 35.

Through ports 41 provided in the upper part of the tank 10 the nutrient solution is inoculated with *Penicillium notatum*. The ports 41 are provided with caps 42. These ports 41 may also be used as air vents and as openings through which various testing devices, such as thermometers and the like, may be inserted into the tank. It is preferred that these ports 41 be located at the top sides of the tank 10, or in the case of cylindrical tanks, off-center as indicated in Figure 2. The reasons for this are that such a construction is better adapted to that use of my invention wherein a group of these tanks is stacked one tank above another, and also because so positioning these openings minimizes the amount of unsterile material that might fall into the tank, especially at the time of inoculation. As shown at 41a, each opening, after the tank has been sterilized as above set forth with the caps 42 in place, is plugged with sterile cotton and the caps 42 removed. This serves to permit some air to enter the tank but at the same time keeps everything sterile.

It should also be noted that the meal 40 will be placed in the tank so as to form a layer beneath the exit port 26 as indicated at 43. Thus, the exhaust port 26 should be located above the top level of the meal with which the chamber is charged, as indicated in Figure 1. This serves to keep the penicillin solution drawn off clear of debris.

When it is desired to withdraw the penicillin solution from the chamber 10, the valve 27 is opened and the penicillin solution drawn off from between the mold layer and the meal. The mold will form at the surface of the solution and will thus be supported by the cheese cloth 35. It may be possible, in some cases, to omit the use of the cheese cloth or the like, for sometimes the mold growth will be so thick as to form a layer which will support itself and not break even when the free solution is withdrawn from under it. The port 21 is located beneath the level at which the mold will form so that this mold growth will not be broken up and mixed up in the nutrient solution which will be added in subsequent operations using that same mold. The penicillin solution is thus kept clear of debris. A drain 44 is also provided for the tank 10 to aid in cleaning it.

Penicillin solution produced according to my process is strong enough and pure enough to be used for some purposes in the form in which it exists when withdrawn from the tank 10. It is often desirable, however, to obtain stronger concentrations than this. I have found that the solution may be concentrated in penicillin content by subjecting it to a series of continuous freezing operations in which water is gradually frozen out of the mixture, the freezing point of penicillin in solution being lower than that of water. Such an apparatus, itself old in the art, I have indicated generally at 29. The thus concentrated penicillin solution is collected in some suitable container 45.

It is contemplated that with tanks constructed as above, many such tanks could be maintained in stacked relationship within a temperature controlled room. Great savings in space can thus be realized by using my process and apparatus. This saving is obtained due to the fact that my process, and consequently my apparatus, contemplate a relatively shallow depth of solution as compared to the larger vat-type constructions now in use.

It is to be understood that changes and modifications may be made in my apparatus without departing from the spirit of my invention, and that I do not intend my invention to be limited to the specific example above set forth, except insofar as such detail is set forth in the subjoined claims.

Having thus described my invention, what I claim as new and desire to secure by Letters Patent is:

1. The process of forming a solution from which penicillin can be extracted which consists of admixing in water lactose, traces of inorganic salts, and hominy meal in a quantity by weight exceeding the lactose, autoclaving the mixture, thereby forming a nutrient solution, inoculating the nutrient solution with a culture of *Penicillium notatum*, maintaining the solution at around 20 to 25° C. during the growth of this mold on the surface of the solution until the pH thereof has reached around 7, and then decanting the solution from between the meal which sinks to the bottom and the mold which is supernatant.

2. The process of claim 1 including the steps of retaining enough of the solution to cover the meal, and permitting the mold therein to develop its spores, and then inoculating a new nutrient solution with said spores.

3. The process of forming a solution from which penicillin can be extracted, which consists in forming a solution in the proportions to form one liter with water, and containing in addition around one gram altogether of inorganic sulphates, around 3 grams of sodium nitrate, around 40 grams of lactose, adding around 50 grams of hominy meal, autoclaving the solution, thereby rendering it sterile and producing a nutrient solution supernatant with respect to the meal which sinks to the bottom, then inoculating the nutrient solution with a *Penicillium notatum*, maintaining the solution at around 20 to 25° C. whereby the mold grows on the surface of the solution, and when the pH of the solution has reached 7, decanting the nutrient solution.

4. The process of forming a solution from which penicillin can be extracted, which consists in forming a solution in the proportions to form one liter with water, and containing in addition around one gram altogether of inorganic sulphates, around 3 grams of sodium nitrate, around 40 grams of lactose, adding around 50 grams of hominy meal, autoclaving the solution, thereby rendering it sterile and producing a nutrient solution supernatant with respect to the meal which sinks to the bottom, then inoculating the nutrient solution with *Penicillium notatum*, maintaining the solution at around 20 to 25° C. whereby the mold grows on the surface of the solution, and when the pH of the solution has reached 7, decanting the nutrient solution, leaving sufficient solution over the hominy meal after decanting so as to maintain the mold and permitting it to grow to the spore stage, then using the spores to inoculate a new growth cycle in a nutrient solution.

GRACE HALLER.

REFERENCES CITED

The following references are of record in the file of this patent:

UNITED STATES PATENTS

| Number | Name | Date |
|---|---|---|
| 1,800,965 | Spalding | Apr. 14, 1931 |
| 2,437,918 | McCormack | Mar. 16, 1948 |
| 2,442,141 | Moyer | May 25, 1948 |
| 2,457,585 | McCormack | Dec. 28, 1948 |

FOREIGN PATENTS

| Number | Country | Date |
|---|---|---|
| 552,619 | Great Britain | Apr. 16, 1943 |
| 575,472 | Great Britain | Feb. 19, 1946 |

OTHER REFERENCES

Abraham et al., The Lancet, Aug. 16, 1941, pages 177 and 178.

RaO, Nature, July 15, 1944, page 83.